United States Patent
Zheng et al.

(10) Patent No.: US 10,354,673 B2
(45) Date of Patent: Jul. 16, 2019

(54) NOISE REDUCTION METHOD AND ELECTRONIC DEVICE

(71) Applicants: HISENSE MOBILE COMMUNICATIONS TECHNOLOGY CO., LTD., Qingdao, Shandong (CN); HISENSE INTERNATIONAL CO., LTD., Qingdao, Shandong (CN); HISENSE USA CORPORATION, Suwanee, GA (US)

(72) Inventors: Weibo Zheng, Shandong (CN); Bingyu Geng, Shandong (CN)

(73) Assignees: HISENSE MOBILE COMMUNICATIONS TECHNOLOGY CO., LTD., Qingdao (CN); HISENSE INTERNATIONAL CO., LTD., Qingdao (CN); HISENSE USA CORPORATION, Suwanee, GA (US)

( * ) Notice: Subject to any disclaimer, the term of this patent is extended or adjusted under 35 U.S.C. 154(b) by 0 days.

(21) Appl. No.: 16/156,558

(22) Filed: Oct. 10, 2018

(65) Prior Publication Data

US 2019/0057712 A1    Feb. 21, 2019

(30) Foreign Application Priority Data

Jan. 24, 2018 (CN) .......................... 2018 1 0069381
Sep. 12, 2018 (WO) ................ PCT/CN2018/105201

(51) Int. Cl.
*G10L 21/02* (2013.01)
*H04R 3/00* (2006.01)
(Continued)

(52) U.S. Cl.
CPC ....... G10L 21/0232 (2013.01); H04M 1/6008 (2013.01); H04R 5/04 (2013.01); *G10L 21/0208* (2013.01)

(58) Field of Classification Search
CPC . H04R 3/00; H04R 3/04; H04R 3/005; H04R 5/00; H04R 5/04; H04R 25/505;
(Continued)

(56) References Cited

U.S. PATENT DOCUMENTS 5,392,381 A * 2/1995 Furuya ..................... G01H 3/00
704/201
6,381,272 B1 * 4/2002 Ali ..................... H03H 21/0012
370/291

(Continued)

*Primary Examiner* — Thang V Tran
(74) *Attorney, Agent, or Firm* — Knobbe, Martens, Olson & Bear LLP

(57) ABSTRACT

The disclosure provides a noise reduction method and an electronic device. In an embodiment of the disclosure, when determining that a plurality of first applications occupy a plurality of first audio channels connected with a microphone and a second application occupies a second audio channel connected with a speaker, the electronic device resamples the audio data of the second audio channel according to the sampling rates corresponding to the plurality of first audio channels and then performs the noise reduction processing on the audio data of each of the plurality of first audio channels respectively according to the audio data obtained by resampling.

19 Claims, 4 Drawing Sheets

(51) Int. Cl.
*G10L 21/0232* (2013.01)
*H04R 5/04* (2006.01)
*H04M 1/60* (2006.01)
*G10L 21/0208* (2013.01)

(58) Field of Classification Search
CPC ..... G10L 21/00; G10L 21/02; G10L 21/0208; G10L 21/0232; G10L 2021/02; G10L 2021/0216; G10L 2021/20165; G10K 2210/3051; G10K 11/17879; H04M 9/08; H04M 9/082; H04M 1/6008
See application file for complete search history.

(56) References Cited

U.S. PATENT DOCUMENTS

| | | | | |
|---|---|---|---|---|
| 7,359,504 | B1* | 4/2008 | Reuss | H04M 9/082 |
| | | | | 379/406.01 |
| 8,401,176 | B2* | 3/2013 | Knutson | H04M 9/082 |
| | | | | 379/406.01 |
| 9,008,302 | B2* | 4/2015 | Thapa | H04M 3/002 |
| | | | | 379/406.01 |
| 9,589,575 | B1* | 3/2017 | Ayrapetian | H04R 3/02 |
| 2008/0273716 | A1* | 11/2008 | Saito | H04M 9/082 |
| | | | | 381/93 |
| 2009/0097669 | A1* | 4/2009 | Kamiya | G10K 11/178 |
| | | | | 381/71.4 |
| 2011/0211706 | A1* | 9/2011 | Tanaka | H04M 9/082 |
| | | | | 381/66 |
| 2014/0128004 | A1* | 5/2014 | Muralidhar | H04B 17/13 |
| | | | | 455/67.11 |

* cited by examiner

NOISE REDUCTION METHOD AND ELECTRONIC DEVICE

CROSS-REFERENCE

This application claims priority under 35 U.S.C. § 119 to International Application No. PCT/CN2018/105201, filed Sep. 12, 2018, and Chinese Patent Application No. CN201810069381.7, filed Jan. 24, 2018, and titled "noise reduction method and electronic device". The entire disclosure of each of the above applications is incorporated herein by reference.

FIELD

The disclosure relates to audio signal processing, and particularly to a noise reduction method and an electronic device.

BACKGROUND

From a physiological standpoint, all sounds that hamper normal rest, study, and work of people or interfere with sounds that people want to hear are noises. In this sense, noises have a very wide range, and e.g., sounds made by cars in the streets, voices in a quiet library, machine sounds on a construction site, and loud sound of a neighbor's television are all noises.

Commonly, the strength of noise is measured by decibels ("dB"), and impact of noise on signal is measured by the signal to noise ratio (S/N). As described above, possible sources of noises include airplanes, cars, factories, construction sites, and the like.

SUMMARY

The disclosure provides a noise reduction method and an electronic device, so as to solve an existing problem that electronic devices cannot avoid collecting useful sound together with noises when the noises exist, thereby undermining the sound collecting effect.

An embodiment of the disclosure provides a noise reduction method. The method includes: determining a plurality of first applications and a second application, where the plurality of first applications occupy a plurality of first audio channels connected with a microphone, the second application occupies a second audio channel connected with a speaker, and the plurality of first applications are different from the second application; according to sampling rates of audio data of the plurality of first audio channels, resampling audio data of the second audio channel, where sampling rates for the resampling of the audio data of the second audio channel correspond to each of the sampling rates of the audio data of the plurality of first audio channels, respectively; and performing noise reduction processing on the audio data of each of the plurality of first audio channels according to the resampled audio data of the second audio channel resampled at the sampling rates corresponding to each of the sampling rates of the audio data of the plurality of first audio channels, respectively.

An embodiment of the disclosure provides an electronic device. The electronic device includes microphone, a speaker, a memory and a processor. The memory stores computer instructions and the processor is configured to execute the computer instructions to perform operations of: determining a plurality of first applications and a second application, where the plurality of first applications occupy a plurality of first audio channels connected with a microphone, the second application occupies a second audio channel connected with a speaker, and the plurality of first applications are different from the second application; according to sampling rates of audio data of the plurality of first audio channels, resampling audio data of the second audio channel, where sampling rates for the resampling of the audio data of the second audio channel correspond to each of the sampling rates of the audio data of the plurality of first audio channels, respectively; and, performing noise reduction processing on the audio data of each of the plurality of first audio channels according to the resampled audio data of the second audio channel resampled at the sampling rates corresponding to each of the sampling rates of the audio data of the plurality of first audio channels, respectively.

DRAWINGS

In order to illustrate the technical solutions in the embodiments of the disclosure more clearly, the accompanying figures to be used in describing the embodiments will be introduced below briefly. The accompanying figures described below are only some embodiments of the disclosure, and other accompanying figures can also be obtained by those of ordinary skill in the art according to these accompanying figures without creative labor.

DETAILED DESCRIPTION

In order to make the objects, technical solutions, and advantages of the disclosure clearer, the disclosure will be further illustrated below in details with reference to the accompanying drawings. The embodiments described in the disclosure are only a subset of the embodiments of the disclosure, and not all of the embodiments contemplated by the disclosure. Based upon the embodiments described in the disclosure, other embodiments understood by those of ordinary skill in the art without undue experimentation are part of the protection scope of the disclosure.

When a user uses an electronic device such as a mobile phone or a walkie-talkie to collect sound (e.g., during video recording or talkback), if noises exist (e.g., the electronic device has an incoming call while collecting the sound and a speaker of the electronic device plays the ring tone), the electronic device would collect the noises as well, thereby undermining the sound collecting effect.

As such, electronic devices have to collect useful sound together with noises when the noises exist, thereby undermining the sound collecting effect.

Figures 1, 2:
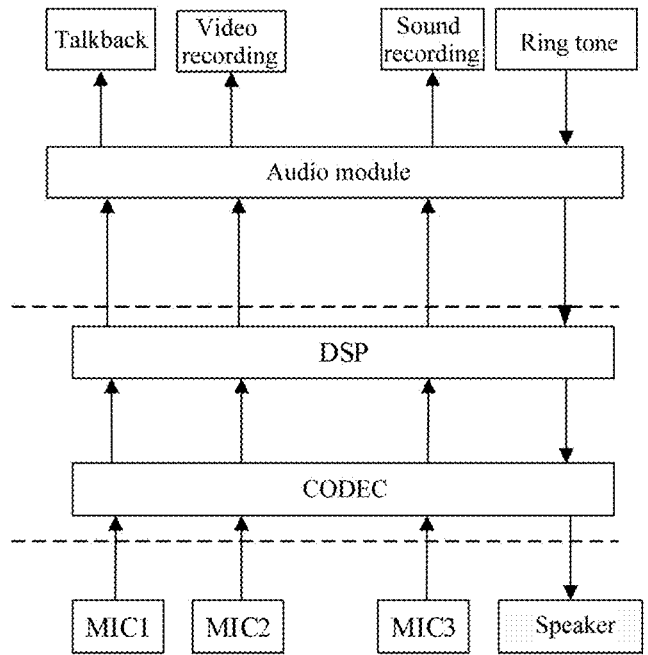
FIG. 1 shows a schematic diagram of an example of a plurality of audio channels included in an electronic device according to an embodiment of the disclosure.
FIG. 2 shows a flow chart of a noise reduction method according to an embodiment of the disclosure.

FIG. 1 illustrates an exemplary electronic device having a plurality of audio channels according to an embodiment of the disclosure. As shown in FIG. 1, in the electronic device, the audio data of the talkback (e.g., for telephone calls) occupies one audio channel, the audio data of the sound recording occupies one audio channel, the audio data of the video recording occupies one audio channel, and the ring tone occupies one audio channel. The audio data of the talkback, the audio data of the video recording, and the audio data of the sound recording all occupy the audio channels connected with the microphone ("MIC"), and such audio channels are called the first audio channels. Correspondingly, the audio data of the talkback, the audio data of the video recording and the audio data of the sound recording is the audio data of the first audio channels. The ring tone occupies the audio channel connected with the speaker, such audio channel is called the second audio channel, and the audio data of the ring tone is the audio data of the second audio channel. As such, different audio channels are allocated to different applications, thereby performing various functions such as the talkback, sound recording, and video recording simultaneously.

In FIG. 1, if the phone rings during the sound recording, video recording, or talkback, in order to prevent the audio data received during the sound recording, video recording, or talkback application from being affected by the audio data of the ring tone, the audio data of the ring tone included in the audio data of the corresponding first audio channel needs to be reduced or eliminated. Besides the audio data of the ring tone, any other sounds outputted by the speaker (i.e., the audio data of the second audio channel) such as music played by the speaker and included in the audio data of the first audio channel should be reduced or eliminated.

As shown in FIG. 2, an embodiment of the disclosure provides a noise reduction method. The method includes operations 200 to 202.

Operation 200: the electronic device determines a plurality of first applications and a second application, where the plurality of first applications occupy a plurality of first audio channels connected with a microphone, the second application occupies a second audio channel connected with a speaker, and the plurality of first applications are different from the second application.

When a noise processing module of the electronic device performs noise reduction processing, frequencies of both an original signal and a reference signal should be the same. In order to reduce or eliminate audio data of the second audio channel creating noise in audio data of the plurality of first audio channels, the audio data of the second audio channel is resampled a plurality of times to obtain a plurality of copies of resampled audio data of the second audio channel, and each of the plurality of copies has a sampling rate the same as one of the sampling rates of the audio data of the plurality of first audio channels. Thus, the operation 201 includes: the electronic device resamples audio data of the second audio channel at each of sampling rates of the audio data of the plurality of first audio channels, respectively.

Operation 202: the electronic device performs noise reduction processing on the audio data of each of the plurality of first audio channels, respectively, according to the resampled audio data of the second audio channel.

In some embodiments of the disclosure, when determining that the different first and second applications occupy the plurality of first audio channels connected with the microphone and the second audio channel connected with the speaker, respectively, the electronic device resamples the audio data of the second audio channel at each of the sampling rates of the audio data of the plurality of first audio channels, respectively, and then performs the noise reduction processing on the audio data of the plurality of first audio channels according to the resampled audio data. In this way, the interference caused by the audio data of the second audio channel on the audio data of the plurality of first audio channels is eliminated or reduced, thereby improving the sound collecting quality.

In some embodiments, the above-mentioned resampling is implemented by at least one of the following algorithms: nearest neighbor interpolation, bilinear interpolation, and cubic convolution interpolation.

Figure 3:
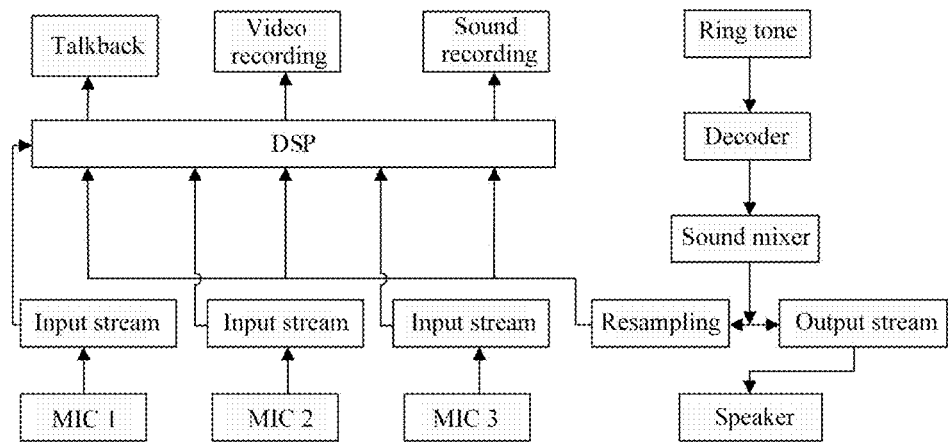
FIG. 3 shows a schematic diagram of an implementation of a noise reduction method according to an embodiment of the disclosure.

As shown in FIG. 3, in an embodiment, the electronic device resamples the audio data of the second audio channel at each of the sampling rates of the audio data of the plurality of first audio channels, respectively, by: making copies of the audio data outputted by the second audio channel via a sound mixer for each of the plurality of first audio channels; and for each copy of the audio data of the second audio channel: resampling the copy of the audio data of the second audio channel at the sampling rate of the audio data of the corresponding first audio channel. The resampled audio data is inputted to the noise processing module of the electronic device.

In an embodiment, when an application X is to occupy an audio channel, the Digital Signal Processing ("DSP") module of the electronic device records a correspondence between the application X and the audio channel to be occupied by the application X. When the COder-DECoder ("CODEC") encodes audio data received by the MIC and then sends the encoded audio data to the DSP module, the DSP module determines the application X corresponding to the encoded audio data received by the MIC according to the previously-recorded correspondence between the application X and the audio channel, and then reformats the audio data according to a relationship between an application type of the determined application X and a reformatting parameter. After the reformatting is finished, the DSP module sends the reformatted audio data to the noise processing module via a virtual sound card to perform the noise reduction processing.

The output stream in FIG. 3 refers to audio data which is outputted into the speaker directly without being resampled.

The input stream in FIG. 3 refers to audio data which is received by the MICs 1 to 3 and is inputted into the DSP module after being encoded by the CODEC.

In FIG. 3, the MICs 1 to 3 correspond to different first audio channels, respectively. The MIC 1 is connected with the audio channel occupied by the talkback application; the MIC 2 is connected with the audio channel occupied by the video recording application; and the MIC 3 is connected with the audio channel occupied by the sound recording application. That is, the audio data of the talkback is received by the MIC 1, the audio data of the video recording is received by the MIC 2, and the audio data of the sound recording is received by the MIC 3. In this way, the audio data received by the three MICs is different, thereby improving the noise reduction effect.

In an embodiment, audio channels of a same application are connected with one or a plurality of MICs.

In FIG. 3, the second audio channel corresponding to the ring tone is the audio channel connected with the speaker. The audio data of the ring tone is noise to the audio data of the sound recording, video recording, and talkback, so the audio data of the ring tone included in the audio data of the first audio channels needs to be reduced or eliminated.

As shown in FIG. 3, after receiving the audio data of the ring tone, the electronic device first decodes the audio data of the ring tone through the decoder and then sends the decoded audio data to the sound mixer, and then the sound mixer makes copies of the audio data, where a copy of the audio data is directly sent to the speaker for outputting, and the other copies of the audio data are resampled and then sent to the noise processing module for the noise reduction.

In an embodiment, the electronic device determines the sampling rates of the audio data of the plurality of first audio channels by: determining sampling rates of audio data of the plurality of first applications according to the correspondences between applications and sampling rates; and taking the sampling rates of the audio data of the plurality of first applications as the sampling rates of the audio data of the plurality of first audio channels.

Figure 4:
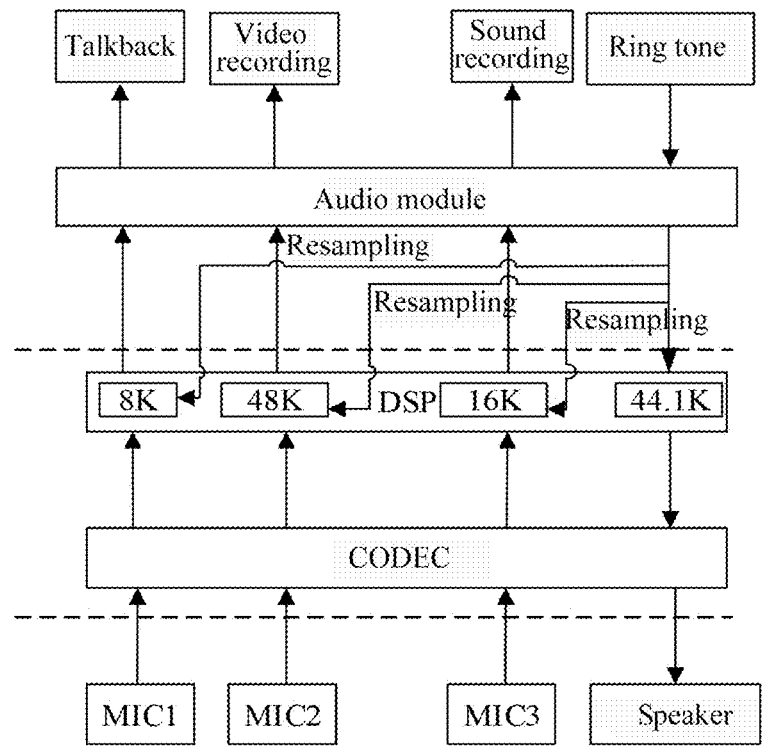
FIG. 4 shows a schematic diagram of an example of a noise reduction method according to an embodiment of the disclosure.

FIG. 4 shows an example of the noise reduction method illustrated by FIG. 2, where the audio data of the ring tone is reduced or eliminated as a noise and it is assumed that the sampling rate of the audio data of the ring tone is 44.1 KHz, the sampling rate of the audio data of the sound recording is 16 KHz, the sampling rate of the audio data of the video recording is 48 KHz, and the sampling rate of the audio data of the talkback is 8 KHz.

In order to reduce or eliminate the impact of the ring tone on the sound recording, video recording, and talkback, the sound mixer makes copies of the received audio data of the ring tone to obtain three copies of the audio data and sends the three copies to the audio channels corresponding to the talkback, video recording, and sound recording, respectively, as reference signals after resampling the three copies, respectively. In the resampling process, the sound mixer resamples the audio data of the ring tone, originally sampled at 44.1 KHz, at 16 KHz and sends the resampled audio data of the ring tone to the noise processing module to reduce or eliminate the audio data of the ring tone in the first audio channel occupied by the sound recording; the sound mixer resamples the audio data of the ring tone, originally sampled at 44.1 KHz, at 48 KHz and sends the resampled audio data of the ring tone to the noise processing module to reduce or eliminate the audio data of the ring tone in the first audio channel occupied by the video recording; and the sound mixer resamples the audio data of the ring tone, originally sampled at 44.1 KHz, at 8 KHz and sends the resampled audio data of the ring tone to the noise processing module to reduce or eliminate the audio data of the ring tone in the first audio channel occupied by the talkback.

In an embodiment, the resampled audio data, as a reference signal for an original signal (i.e., audio data of a first application occupying a first audio channel), is sent to the DSP module for reformatting, and then the noise processing module reduces or eliminates a part of the original signal which is the same as the reference signal using a noise reduction algorithm, to obtain clear voice data. The noise reduction algorithm includes, for example, an algorithm which performs noise reduction by using noise cancellation principles.

In an embodiment, after receiving audio data of a first audio channel Y of the first audio channels, the DSP module reformats the audio data of the first audio channel Y according to one or more parameters corresponding to the type of an application YY occupying the first audio channel Y. For example, for any one of the first audio channels, the DSP module determines one or more reformatting parameters corresponding to an application type of one application occupying the first audio channel, and the DSP module reformats the audio data of the first audio channel according to the one or more reformatting parameters.

The above-mentioned "reformatting" refers to the DSP module changing parameters (including sampling rate, the number of sound channels, bit width, and the like) according to different application requirements for the received and encoded audio data.

For example, suppose that the reformatting parameter is the tone quality, where the tone quality of the talkback is level 1, the tone quality of the sound recording is level 2, and the tone quality of the video recording is level 3; the audio data 1-4 correspond to the first audio channels 1-4, and the first audio channels 1-4 correspond to the talkback, video recording, sound recording, and ring tone on the phone respectively. Then, after the DSP module receives the audio data 1, the DSP module reformats the audio data 1 by defining the tone quality of the audio data 1 as level 1; after the DSP module receives the audio data 2, the DSP module reformats the audio data 2 by defining the tone quality of the audio data 2 as the level 2; and after the DSP module receives the audio data 3, the DSP module reformats the audio data by defining the tone quality of the audio data 3 as the level 3.

The DSP module above is implemented by a DSP chip, and the noise processing module is implemented by the DSP chip or a processor.

Figure 5:
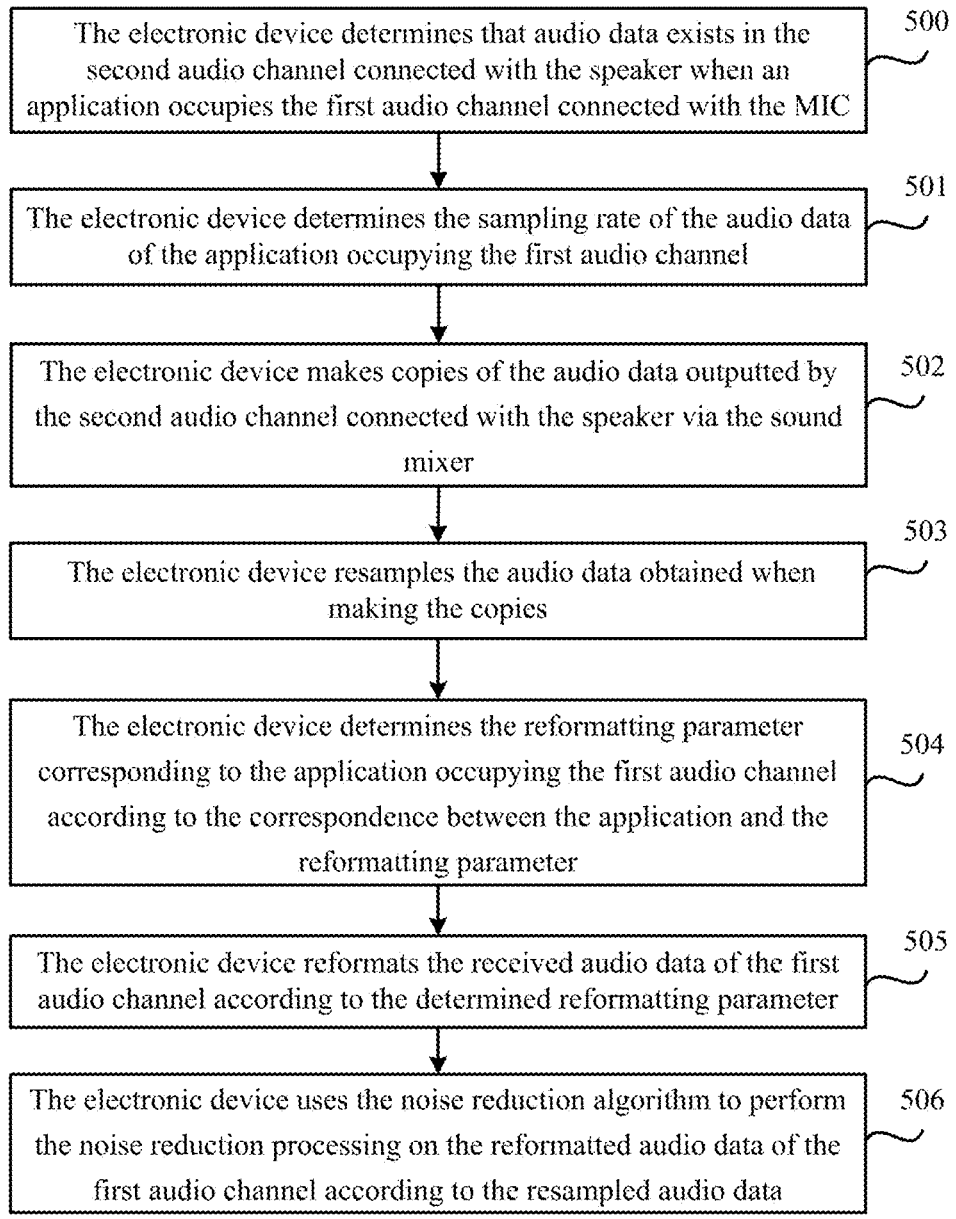
FIG. 5 shows a flow chart of an implementation of a noise reduction method according to an embodiment of the disclosure.

FIG. 5 shows a flow chart of an implementation of a noise reduction method according to an embodiment of the disclosure, where the implementation includes operations 501 to 506. Here, it is taken as an example that the audio data of the first audio channel connected with the MIC is preserved and the audio data of the second audio channel connected with the speaker is reduced or eliminated in the first audio channel.

Operation 500: the electronic device determines that audio data exists in the second audio channel connected with the speaker when an application occupies the first audio channel connected with the MIC.

Operation 501: the electronic device determines the sampling rate of the audio data of the application occupying the first audio channel.

Operation 502: the electronic device makes copies of the audio data outputted by the second audio channel connected with the speaker via the sound mixer.

Operation 503: the electronic device resamples the audio data obtained when making the copies.

Operation 504: the electronic device determines the reformatting parameter corresponding to the application occupying the first audio channel according to the correspondence between the application and the reformatting parameter.

Operation 505: the electronic device reformats the received audio data of the first audio channel according to the determined reformatting parameter.

Operation 506: the electronic device uses the noise reduction algorithm to perform the noise reduction processing on the reformatted audio data of the first audio channel according to the resampled audio data.

Based upon similar concepts, an embodiment of the disclosure further provides a device comprising a noise reduction module. Since the concept solving the problem of this device is similar to the concept solving the problem of the noise reduction method according to the embodiment of the disclosure, the implementations of this device can refer to the implementations of the method, and the repeated description thereof will be omitted here.

Figure 6:
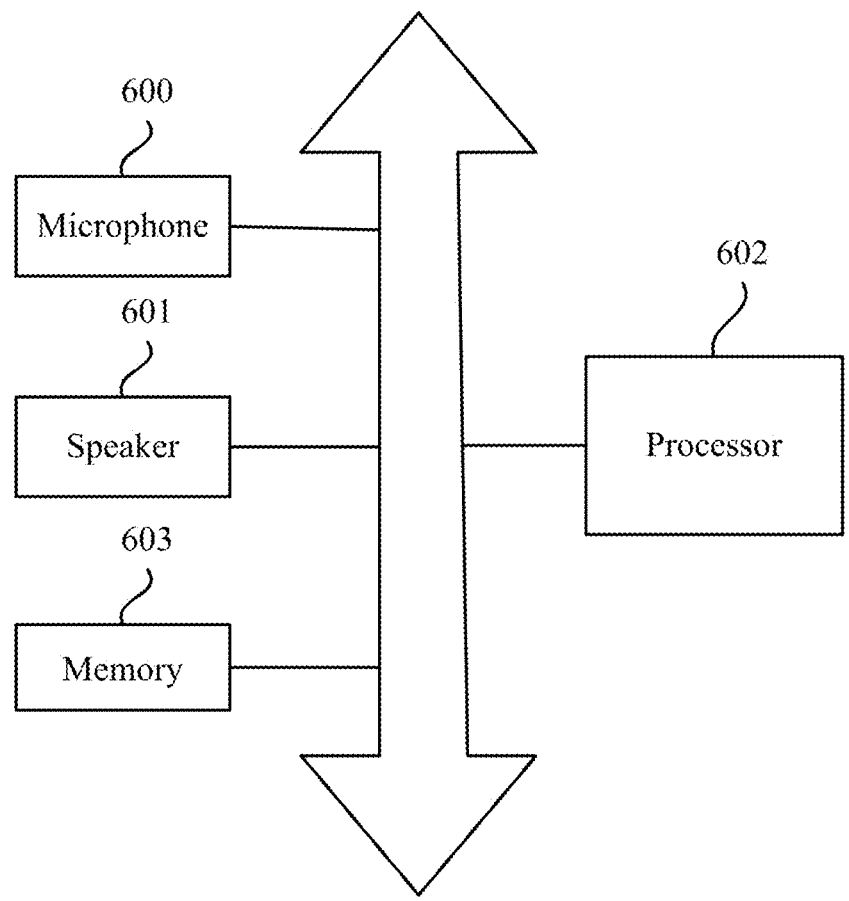
FIG. 6 shows a structure block diagram of a noise reduction device according to an embodiment of the disclosure.

As shown in FIG. 6, an embodiment of the disclosure provides an electronic device which includes a microphone 600, a speaker 601, a processor 602, and a memory 603. The memory 603 stores the computer instructions and the processor 602 is configured to execute these computer instructions to perform operations of: determining a plurality of first applications and a second application, where the plurality of first applications occupy a plurality of first audio channels connected with the microphone 600, the second application occupies a second audio channel connected with the speaker 601, and the plurality of first applications are different from the second application; according to sampling rates of audio data of the plurality of first audio channels, resampling audio data of the second audio channel, where the sampling rates for the resampling of the audio data of the second audio channel each correspond to each of the sampling rates of the audio data of the plurality of first audio channels, respectively; and, performing noise reduction processing on the audio data of each of the plurality of first audio channels according to the resampled audio data of the second audio channel resampled at the sampling rates corresponding to each of the sampling rates of the audio data of the plurality of first audio channels, respectively.

In an embodiment, the processor 602 is further configured to execute the computer instructions to perform operations of: making copies of the audio data of the second audio channel according to the number of the plurality of first audio channels; and, for each copy of the audio data of the second audio channel: resampling the copy of the audio data of the second audio channel at the sampling rates of the audio data of the corresponding first audio channel.

In an embodiment, the processor 602 is further configured to execute the computer instructions to perform operations of: determining sampling rates corresponding to audio data of the plurality of first applications according to correspondences between applications and sampling rates; and, taking the sampling rates corresponding to the audio data of the plurality of first applications as the sampling rates corresponding to the audio data of the plurality of first audio channels.

In an embodiment, the electronic device further includes a DSP chip. The processor 602 is further configured to execute the computer instructions to perform operations of: determining one or more reformatting parameters corresponding to one or more application types of the plurality of first applications; and, reformatting, by the DSP module, the audio data of each of the plurality of first audio channels, respectively, according to the one or more reformatting parameters.

In an embodiment, the plurality of first applications include one or more of: a video recording application, a sound recording application, and a talkback application.

Figure 7:
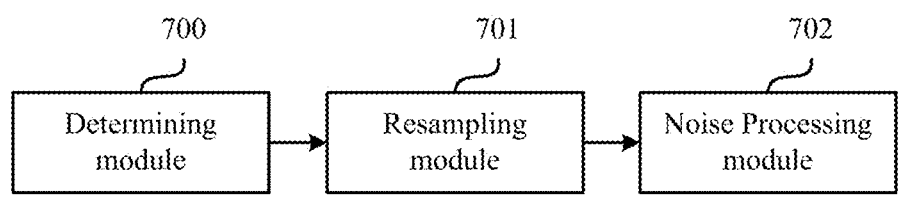
FIG. 7 shows a structure block diagram of another noise reduction device according to an embodiment of the disclosure.

As shown in FIG. 7, an embodiment of the disclosure provides a noise reduction device. The device includes a determining module 700, a resampling module 701, and a noise processing module 702.

The determining module 700 is configured to determine one or more first applications and a second application, where the one or more first applications occupy one or more first audio channels connected with a microphone, the second application occupies a second audio channel connected with a speaker, and the one or more first applications are different from the second application.

The resampling module 701 is configured to resample audio data of the second audio channel at each of one or more sampling rates of the audio data of the one or more first audio channels, respectively.

The noise processing module 702 is configured to perform noise reduction processing on the audio data of each of the one or more first audio channels, respectively, according to the resampled audio data of the second audio channel.

In an embodiment, the noise processing module 702 is further configured to: make copies of the audio data of the second audio channel for each of the one or more first audio channels; and, for each copy of the audio data of the second audio channel: resample the copy of the audio data of the second audio channel at one of the one or more sampling rates of the audio data of the corresponding first audio channel.

In an embodiment, the noise processing module 702 is configured to determine the one or more sampling rates of the audio data of the one or more first audio channels by: determining one or more sampling rates of audio data of the one or more first applications according to correspondences between applications and sampling rates; and, taking the one or more sampling rates of the audio data of the one or more first applications as the one or more sampling rates of the audio data of the one or more first audio channels.

In an embodiment, the noise processing module 702 is further configured to: determine one or more reformatting parameters corresponding to one or more application types of the one or more first applications; and, reformat the audio data of each of the one or more first audio channels, respectively, according to the one or more reformatting parameters.

In an embodiment, the one or more first applications include one or more of: a video recording application, a sound recording application, and a talkback application.

The present disclosure has been described above by reference to the block diagrams and/or flow charts showing the methods, devices, systems, and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

Those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A noise reduction method, comprising:
determining a plurality of first applications and a second application, wherein the plurality of first applications occupy a plurality of first audio channels connected with a microphone, the second application occupies a second audio channel connected with a speaker, and the plurality of first applications are different from the second application;
resampling audio data of the second audio channel at each of a plurality of sampling rates of the audio data of the plurality of first audio channels, respectively; and
performing noise reduction processing on the audio data of each of the plurality of first audio channels, respectively, according to the resampled audio data of the second audio channel.

2. The method according to claim 1, wherein performing noise reduction processing on the audio data of each of the plurality of first audio channels, respectively, comprises:
for each first audio channel of the plurality of first audio channels: reducing or eliminating a part of the audio data of the first audio channel wherein the reduced or eliminated part of the audio data of the first audio channel is the same as the resampled audio data of the second audio channel resampled at the sampling rate of the first audio channel.

3. The method according to claim 1, wherein the resampling is implemented by at least one of the following algorithms:
nearest neighbor interpolation, bilinear interpolation, and cubic convolution interpolation.

4. The method according to claim 1, before performing noise reduction processing on the audio data of each of the plurality of first audio channels, further comprising:
reformatting, by a Digital Signal Processing (DSP) module, the audio data of the plurality of first audio channels.

5. The method according to claim 4, after the reformatting, further comprising:
sending, by the DSP module, the reformatted audio data to a noise processing module via a virtual sound card to perform the noise reduction processing.

6. The method according to claim 1, wherein the second application includes an application for playing sound via the speaker.

7. The method according to claim 1, wherein the plurality of first applications comprise one or more of: a video recording application, a sound recording application, and a talkback application.

8. The method according to claim 7, wherein the plurality of first audio channels are occupied by different types of first applications.

9. The method according to claim 7, wherein the plurality of first audio channels are occupied by multiple first applications of a same type running simultaneously.

10. The method according to claim 1, wherein resampling the audio data of the second audio channel at each of the sampling rates of the audio data of the plurality of first audio channels, respectively, comprises:
making a copy of the audio data of the second audio channel for each of the plurality of first audio channels; and
for each copy of the audio data of the second audio channel: resampling the copy of the audio data of the second audio channel at the sampling rate of the audio data of the corresponding first audio channel.

11. The method according to claim 1, further comprising:
making copies of the audio data of the second audio channel;
sending a copy of the audio data of the second audio channel to the speaker to perform audio playing; and
using a plurality of copies of the audio data of the second audio channel for the resampling.

12. The method according to claim 1, further comprising:
recording a correspondence between an activated application and an audio channel.

13. The method according to claim 1, further comprising:
determining sampling rates of audio data of the plurality of first applications according to correspondences between applications and sampling rates; and
taking the sampling rates of the audio data of the plurality of first applications as the sampling rates of the audio data of the plurality of first audio channels for the step of resampling audio data of the second audio channel.

14. The method according to claim 4, wherein the reformatting, by the DSP module, the audio data of the plurality of first audio channels, comprises:
determining one or more reformatting parameters corresponding to one or more application types of the plurality of first applications; and
reformatting, by the DSP module, the audio data of each of the plurality of first audio channels, respectively, according to the one or more reformatting parameters.

15. An electronic device, comprising a microphone, a speaker, a memory, and a processor, wherein the memory stores computer instructions and the processor is configured to execute the computer instructions to perform operations of:
determining a plurality of first applications and a second application, wherein the plurality of first applications occupy a plurality of first audio channels connected with a microphone, the second application occupies a second audio channel connected with a speaker, and the plurality of first applications are different from the second application;
according to sampling rates of audio data of the plurality of first audio channels, resampling audio data of the second audio channel, wherein sampling rates for the resampling of the audio data of the second audio channel correspond to each of the sampling rates of the audio data of the plurality of first audio channels, respectively; and
performing noise reduction processing on the audio data of each of the plurality of first audio channels according to the resampled audio data of the second audio channel resampled at the sampling rates corresponding to each of the sampling rates of the audio data of the plurality of first audio channels, respectively.

16. The device according to claim 15, wherein the processor is further configured to execute the computer instructions to perform operations of:
making a copy of the audio data of the second audio channel for each of the plurality of first audio channels; and
for each copy of the audio data of the second audio channel: resampling the copy of the audio data of the second audio channel at the sampling rate of the audio data of the corresponding first audio channel.

17. The device according to claim 15, wherein the processor is further configured to execute the computer instructions to perform operations of:

determining sampling rates corresponding to audio data of the plurality of first applications according to correspondences between applications and sampling rates; and taking the sampling rates corresponding to the audio data of the plurality of first applications as the sampling rates corresponding to the audio data of the plurality of first audio channels.

18. The device according to claim 15, further comprising a Digital Signal Processing (DSP) module, wherein the processor is further configured to execute the computer instructions to perform operations of:

determining one or more reformatting parameters corresponding to one or more application types of the plurality of first applications; and reformatting, by the DSP module, the audio data of each of the plurality of first audio channels, respectively, according to the one or more reformatting parameters.

19. The device according to claim 15, wherein the plurality of first applications comprise one or more of: a video recording application, a sound recording application, and a talkback application.

\* \* \* \* \*